United States Patent

[11] 3,607,040

| [72] | Inventors | George L. Hervert<br>Woodstock;<br>Michael G. Gaydos, Mt. Prospect, both of<br>Ill. |
|---|---|---|
| [21] | Appl. No. | 822,854 |
| [22] | Filed | Apr. 28, 1969 |
| [45] | Patented | Sept. 21, 1971 |
| [73] | Assignee | Universal Oil Products Company<br>Des Plaines, Ill. |

[54] PREPARATION OF ALKALI METAL HYDROXIDE PELLETS
6 Claims, No Drawings

[52] U.S. Cl. .................................................... 23/184,
                                                    252/430, 252/476
[51] Int. Cl. .................................................... C01d 1/04,
                                                    B01j 11/06
[50] Field of Search .................................... 23/184;
                                                    252/430, 476

[56] References Cited
UNITED STATES PATENTS

| 2,395,842 | 3/1946 | Borgstrom | 252/476 X |
| 2,629,652 | 2/1953 | Schechter et al. | 23/184 |
| 2,930,762 | 3/1960 | Schoenenberger | 252/430 |
| 3,321,277 | 5/1967 | Bach | 23/184 |
| 3,489,693 | 1/1970 | Bovard | 252/476 |

*Primary Examiner*—Earl C. Thomas
*Assistant Examiner*—G. Alvaro
*Attorneys*—James R. Hoatson, Jr. and Raymond H. Nelson ABSTRACT: Alkali metal hydroxides are treated with a lubricant and thereafter activated at an elevated temperature which is sufficient to reduce the size of the lubricant thereby altering the surface area of the hydroxide. The thus treated hydroxides will possess an unusually high degree of absorbency.

PREPARATION OF ALKALI METAL HYDROXIDE PELLETS

This invention relates to a process for the treatment of an alkali metal hydroxide. More specifically the invention is concerned with a process for increasing the absorbency of alkali metal hydroxide pellets by treating the hydroxide with a lubricant of the type hereinafter set forth in greater detail.

It is known in the art that alkali metal hydroxides will react with carbon dioxide from the atmosphere. This property is of special importance in closed-cycle oxygen systems such as the atmosphere which is found in such closed places as submarines or in rebreathing appliances which are used in anesthesia or emergency oxygen equipment. In rebreather systems it is necessary that the carbon dioxide in the system be 4 percent or less than the entire atmosphere inasmuch as a greater concentration of carbon dioxide will result in a deleterious effect upon the person using the rebreathing equipment. Therefore, it is necessary to provide an absorbent for the carbon dioxide which is exhaled during the normal respiratory.

Heretofore it has been known, as hereinbefore set forth, to utilize an alkali metal hydroxide to absorb the carbon dioxide. Lithium hydroxide has been used in many instances due to the low molecular weight of the compound. However, in many instances the use of an alkali metal hydroxide such as lithium hydroxide has been complicated due to the fact that the physical form of the hydroxide which is used has not been characterized by possessing a relatively high degree of porosity whereby the hydroxide will be able to react with carbon dioxide at increased reaction rates nor be able to resist crumbling due to contact with other objects or a general buffeting about to which a rebreather system may be subjected. This crumbling will result in the formation of a noxious dust which is normally generated when the hydroxide crumbles. The presence of this dust in a rebreather system constitutes a major hazard or drawback to the use of such systems inasmuch as during the normal use of the rebreather system a certain amount of the dust will be inhaled along with the oxygen thereby creating unwanted health hazards to the user of the apparatus.

In view of this, it has now been discovered that the reaction rate of the alkali metal hydroxide with the carbon dioxide with an attendant drop in the formation of noxious dust may be accomplished by treating the hydroxide with a lubricant of the type hereinafter set forth in greater detail whereby the resultant compound will possess an unusually high degree of absorbency.

It is therefore an object of this invention to provide a process for the treatment of alkali metal hydroxides to alter the physical characteristics thereof.

A further object of this invention is to provide a process for treating alkali metal hydroxides with certain compounds whereby the surface area of the hydroxide will be altered as well as the degree of hardness thereof.

In one aspect an embodiment of this invention resides in a process for the treatment of an alkali metal hydroxide which comprises admixing said hydroxide with a lubricant, thereafter calcining the resultant mixture at an elevated temperature to remove any water which may be present, and thereafter recovering the treated alkali metal hydroxide.

A specific embodiment of this invention is found in a process for the treatment of lithium hydroxide which comprises treating said lithium hydroxide with polyvinyl alcohol, thereafter calcining the resultant mixture at a temperature in the range of from about 150° to about 400° C. to remove any water which may be present, and thereafter recovering the treated lithium hydroxide.

Other objects and embodiments will be found in the following further detailed description of the present invention.

As hereinbefore set forth, the present invention relates to a process for the treatment of an alkali metal hydroxide whereby the desirable physical characteristics of hardness and surface area are increased, thereby permitting the treated product to be utilized as an absorbent for carbon dioxide in closed-cycle ventilation or breathing systems. The usual form in which these compounds are used are in canisters or containers when a rebreathing system is the medium and even when the closed system comprises a relatively large area such as a submarine or a space vehicle. By utilizing an alkali metal hydroxide, and particularly lithium hydroxide which has been treated in a manner hereinafter set forth in greater detail, it will be possible to overcome the difficulties which have previously been present when utilizing other forms of carbon dioxide absorbents such as soda-lime, etc. The treatment of the present invention consists in admixing the alkali metal hydroxide, and particularly lithium hydroxide, monohydrate, with a lubricant which possesses certain inherent characteristics. It is imperative that the lubricant which is used will possess a relatively high degree of binding properties as well as the necessary physical characteristics of decreasing in size or being degradable when subjected to the calcination temperatures which are utilized after admixture of the lubricant and the alkali metal hydroxide. By utilizing a lubricant admixture with the alkali metal hydroxide it will facilitate the ease with which the alkali metal hydroxide is formed into pills or pellets. In addition, by utilizing a lubricant which in effect deteriorates, that is, decreases in size at the calcination temperature to which the mixture is subjected, the surface area of the alkali metal hydroxide is altered by increasing in area, that is, having a higher porosity with an increased number of interstices, thus permitting a higher degree of absorption of the carbon dioxide on the surface of the hydroxide. While any solid lubricant which possesses the aforementioned physical properties of adhesiveness and the ability to decrease in size at elevated temperatures may be used, the preferred lubricants comprise polyvinyl alcohol and polyvinyl pyrrolidone due to a relatively high degree of availability. By subjecting the mixture of the lubricant and the alkali metal hydroxide to a calcination temperature in the range of from about 150° to about 400° C. it is possible to render the alkali metal hydroxide anhydrous in nature inasmuch as the untreated or hydrous alkali metal hydroxides do not absorb as well as the alkali metal hydroxides which are in anhydrous condition.

In the preferred embodiment of the invention, the alkali metal hydroxide such as lithium hydroxide, sodium hydroxide, potassium hydroxide, rubidium hydroxide, or cesium hydroxide and a lubricant of the type hereinbefore set forth are admixed and thereafter pressed in pellet or pill form, the finished pellets ranging in size from about one-sixteenth to about one-fourth inch in size. The pellets or pills are prepared by admixing the hydroxide and the lubricant in a conventional manner, the lubricant, in addition to acting as a binding agent for the hydroxide also acts as a lubricating agent for the pilling die and punch in order to reduce the wear thereof. For example, one type of pelleting comprises admixing the two components of the formulation in a compressing machine such as a single-punch or a rotary multiple-punch machine. The three methods for producing the desired pellet or pill may comprise the direct method, the wet method, or the dry method, the preferred way of producing the pellets being the direct method. This method is used inasmuch as the granulations are both solid in nature and may be admixed after crushing the hydroxide and the lubricant and thereafter thoroughly admixing the same in a mill. Less likely ways of preparing the desired products comprise the wet method in which the two ingredients are milled and mixed and thereafter dried by utilizing a cabinet trucktray rotary or infrared drying unit. Thereafter the material is dry-screened to obtain granulations of uniform size as required by the compressing machine and charging the same to said machine. The dry method which is utilized to prepare the granulations may also be used, said method comprising the utilization of a heavy-duty compressing machine which compresses the powders or crystals of the formulation into large tablets or slugs, thereafter breaking down the slugs into the desired granulation size and thereafter charging the granules to the tablet compressing machines.

After passage of the granule mixture into the compressing machine which forms said granules into the desired pellet size, the pellets are then passed to a drying unit of the type hereinbefore set forth in greater detail. The pellets are activated or calcined at a temperature in the range of from about 150° to about 400° C., the only criterion being that the temperature used must be less than the melting point of the alkali metal hydroxide, for a period of time which may range from about 1 up to about 10 hours or more in duration, said activation of the alkali metal hydroxide being effected in an anhydrous, inert atmosphere. This atmosphere is provided for by passing a stream of nitrogen which has previously been treated by passage over sodium or other drying agents before passing through the drying unit. During the activation of the pellets, the lubricant such as the polyvinyl alcohol deteriorates, and hence conglomerates, thus being reduced in size. By being reduced in size, the lithium will expose more of the surface area of the lithium hydroxide, provide a higher porosity, increase the number of interstices, and thus the absorptive quality of the hydroxide for the carbon dioxide will be greatly enhanced. In addition, the alkali metal hydroxide will also lose its water of hydration during this period and thus the treated alkali metal hydroxide will develop an unusually high degree of porosity.

It is also contemplated within the scope of this invention that the treatment of the alkali metal hydroxide with the lubricant may be effected in a continuous manner of operation. When such a type of operation is used, the alkali metal hydroxide and the lubricant are continuously charged to a mixing apparatus which may comprise a pilling method of operation. The hydroxide and lubricant are thoroughly admixed, pilled or pelletized and thereafter passed into an activation zone in a continuous manner. The treated alkali metal hydroxide is subjected to activation at an elevated temperature in the range of from about 150° to about 400° C. depending on the melting point of the hydroxide in an atmosphere substantially inert in nature. This atmosphere may be provided for by introducing a substantially inert gas such as nitrogen into the activation zone. Upon the completion of the desired residence time in the activation zone, the treated alkali metal hydroxide pills which have been dehydrated and which also have had the surface area of the pill increased due to the decrease in size of the lubricant are continuously withdrawn from the activation zone and recovered.

The thus treated alkali metal hydroxide pills or pellets will have the hardness thereof increased to such an extent that the hard, dry pellets, pills, or granules will have a hardness number in excess of 90. This hardness number will permit the use of the alkali metal hydroxide in canisters or other containers whereby the operation will be substantially dust-free in nature.

The aforementioned hardness number is determined by placing pellets of a predetermined size in a sieving machine along with steel balls. The steel balls and granules are shaken and tapped for a predetermined period of time such as 0.5 hours, said sieving machine running at a rate of about 1,750 revolutions per minute of the driving shaft of said machine. Following this, the steel balls are removed from the pan. The contents are brushed on a sieve, following which they are shaken and tapped for a predetermined period in the machine. The weight of the material which remains on the screen multiplied by 2 is the hardness number of the material.

The following examples are given to illustrate the process of the present invention which, however, are not intended to limit the generally broad scope of the present invention in strict accordance therewith.

EXAMPLE I

In this example lithium hydroxide monohydrate powder was admixed with from 2 to 5 percent by weight of polyvinyl alcohol, the latter initially serving as a lubricant during the resulting pilling operation. The pills, one-eighth inch in diameter by one-eighth inch in length were prepared by punches and were activated by placing the pills in a vessel and thereafter heating the vessel to a temperature of 150° to 160° C. while passing a stream of dried nitrogen over the pills. This activation period was continued for a period of 4 hours. During this period, the polyvinyl alcohol conglomerated due to the decomposition by the loss of water from the adjacent hydroxyl groups while the lithium hydroxide also lost its water. Due to the conglomeration of the polyvinyl alcohol, a greater amount of the lithium hydroxide surface was exposed, with an attendant increase in the number of interstices.

EXAMPLE II

Sodium hydroxide powder is admixed with from 2 to about 5 percent by weight of the finished mixture of polyvinyl alcohol. The admixture is then placed in a punch machine and pills which are one-eighth inch in diameter by one-eighth inch in length are prepared, the polyvinyl alcohol serving as a lubricant for the punch during the pilling operation. The thus formed pills are placed in a reaction vessel which is heated to a temperature of about 160° C. while passing a stream of dried nitrogen over the pills for a period of 4 hours. During this activation period the polyvinyl alcohol deteriorates, thereby conglomerating. The conglomeration of the alcohol results in the exposure of a greater amount of the sodium hydroxide surface with a higher porosity of the sodium hydroxide resulting therefrom.

EXAMPLE III

In this example potassium hydroxide is admixed with polyvinyl pyrrolidone, the pyrrolidone being present in an amount of from about 2 to about 5 percent by weight of the finished admixture. The admixture is then pilled by placing said admixture in a punch, the pyrrolidone acting as a lubricant for the punch thereby reducing the wear thereof. The thus prepared pills are then placed in a reaction vessel which is heated to a temperature of about 160° C. for a period of about 4 hours, and inert atmosphere being provided for by passing a stream of dried nitrogen over the pills. Due to the degradation and attendant conglomeration of the polyvinyl pyrrolidone, the surface area and attendant increase in the number of interstices of the potassium hydroxide will occur.

EXAMPLE IV

To illustrate the efficiency of the alkali metal hydroxide which has been treated by admixture with a lubricant capable of deteriorating at the calcination temperature which is used to activate the hydroxide a series of tests were run utilizing various carbon dioxide absorbents. A rebreathing apparatus comprising a scrubbing bag containing the carbon dioxide absorbent, a mixing bag, a protection bag, a mask and a pressure bottle containing an oxygen supply was used in the experiments. The test personnel donned the apparatus and thereafter engaged in strenuous activity which consisted of mounting and dismounting a 12 inch platform 30 times a minute for a period of 10 minutes. During this time inspired atmosphere was monitored for carbon dioxide and oxygen content. The carbon dioxide absorbents which were used in the four tests comprised equal volumes of soda lime pellets, barylime pellets, commercial lithium hydroxide pellets conforming to U.S. Navy specifications and lithium hydroxide pellets which had been admixed with polyvinyl alcohol and activated by heating to a temperature of 160° C. for a period of 4 hours.

Use of the soda lime resulted in a carbon dioxide content in the rebreather apparatus of over 6 percent in less than 5 minutes; use of barylime gave a carbon dioxide content of 5 percent in 6 minutes; the commercial lithium hydroxide gave a carbon dioxide content of 7 percent in less than 8 minutes, while the treated lithium hydroxide had only 3.5 percent carbon dioxide content at the end of the 10 minute test. These results may be summarized in the table below.

| CO₂ Absorbent | CO₂ Content of Apparatus, % | Minutes |
| --- | --- | --- |
| Soda Lime | 6 | 4.5 |
| Barylime | 5 | 6 |
| Commercial LiOH | 7 | 8 |
| Treated LiOH | 3.6 | 10 |

Therefore, it is readily apparent that the lithium hydroxide, which has been admixed with a lubricant such as polyvinyl alcohol and thereafter activated by calcining the mixture, after pelleting, at a temperature of from 150° to 160° C., said polyvinyl alcohol deteriorating at this temperature, to alter the physical characteristics of the lithium hydroxide whereby the hydroxide has a higher porosity and will therefore have a higher rate of reaction with the carbon dioxide, will comprise the most efficient carbon dioxide absorbent. As hereinbefore set forth, it is necessary that the carbon dioxide content of the rebreathing apparatus should be maintained below a level of about 4 percent in order that the faculties of the user not be impaired.

We claim as our invention:

1. A process for the preparation of alkali metal hydroxide pellets having improved hardness and absorbency which comprises admixing solid alkali metal hydroxide granules with a solid lubricant selected from the group consisting of polyvinyl alcohol and polyvinyl pyrrolidone, compressing the resulting mixture into pellets, and calcining the pellets at a temperature of about 150° to 400° C. and below the melting point of said alkali metal hydroxide for a period sufficient to conglomerate said lubricant and to dehydrate said pellets.

2. The process as set forth in claim 1 in which said alkali metal hydroxide is lithium hydroxide monohydrate.

3. The process as set forth in claim 1 in which said alkali metal hydroxide is sodium hydroxide.

4. The process as set forth in claim 1 in which said alkali metal hydroxide is potassium hydroxide.

5. The process as set forth in claim 1 in which said lubricant is polyvinyl alcohol.

6. The process as set forth in claim 1 in which said lubricant is polyvinylpyrrolidone.